United States Patent [19]

Ramsey

[11] Patent Number: 4,981,411

[45] Date of Patent: Jan. 1, 1991

[54] SELF-LOADING TRANSPORT BODY FOR RECYCLABLE WASTE

[75] Inventor: Larry W. Ramsey, Hermitage, Tenn.

[73] Assignee: Rogers Manufacturing Co., Inc., Nashville, Tenn.

[21] Appl. No.: 319,270

[22] Filed: Mar. 6, 1989

[51] Int. Cl.[5] .......... B65F 3/04; B60P 7/04; B65G 67/04

[52] U.S. Cl. .......... 414/487; 414/409; 414/541; 292/201; 292/DIG. 29; 296/101; 298/8 R

[58] Field of Search .......... 414/403, 404, 406, 407, 414/408, 409, 419, 420, 421, 425, 469, 540, 541, 486, 487; 292/201, DIG. 29; 296/101, 184; 298/23 M, 8 R

[56] References Cited

U.S. PATENT DOCUMENTS

| | | | |
|---|---|---|---|
| 1,920,485 | 8/1933 | Silver | 414/487 |
| 2,271,444 | 1/1942 | Schutz et al. | 414/487 |
| 2,788,135 | 4/1957 | Girotti | 414/541 |
| 3,111,346 | 11/1963 | Harbers et al. | 298/8 R |
| 3,148,793 | 9/1964 | Walter | 414/409 |
| 3,211,312 | 10/1985 | Miller | 298/8 R |
| 4,200,330 | 4/1980 | Scott | 296/101 X |
| 4,427,333 | 1/1984 | Ebeling | 414/422 X |
| 4,470,747 | 9/1984 | Tichenor | 414/491 |
| 4,597,710 | 7/1986 | Kovats | 414/409 |
| 4,669,940 | 6/1987 | Englehardt et al. | 414/409 X |
| 4,840,531 | 6/1989 | Dinnean | 414/470 X |
| 4,915,570 | 4/1990 | Rath et al. | 414/409 |

FOREIGN PATENT DOCUMENTS

| | | | |
|---|---|---|---|
| 1155475 | 10/1983 | Canada | 296/184 |
| 3537546 | 4/1987 | Fed. Rep. of Germany | 414/409 |

*Primary Examiner*—Robert J. Spar

*Assistant Examiner*—Robert S. Katz

*Attorney, Agent, or Firm*—Mark J. Patterson

[57] ABSTRACT

A tiltable truck body is specially adapted for loading, transport, and unloading of recyclable waste materials. Plural interior waste compartments are separated by independently controlled inner doors. Side mounted buckets mounted on roller tracks and connected to a hydraulic drive assembly by hinged lift arms permit separable curbside loading and dumping of waste material in confined areas.

5 Claims, 11 Drawing Sheets

SELF-LOADING TRANSPORT BODY FOR RECYCLABLE WASTE

BACKGROUND OF THE INVENTION

The present invention relates to a means for collection and transport of waste materials and specifically to truck bodies capable of loading, transporting, and unloading separated recyclable waste.

In an era when conservation of raw materials and natural resources has become a major concern, recycling of consumer waste such as paper, glass, aluminum, and plastic is playing an increasingly important role. However, efficient recycling requires means for collecting and transporting waste materials separately, so that scrap aluminum, for example, can be delivered to a recycling facility without being mixed with other substances. The traditional garbage collection truck, of course, collects and transports waste in a collective mass.

Compartmentalized truck bodies for waste collection are known in the prior art, as are various side-mounted means for loading waste from street level into a collection truck. However, these two concepts have not been combined in such a way as to provide for rapid loading of separate waste storage compartments using loading mechanisms that operate quickly and in confined areas. In addition, repair and maintenance of prior art self-loading waste truck bodies is time consuming and costly because of their complexity and difficulty in disassembly.

What is needed, then, is a self-loading truck body which is easily maintained and which is specially adapted for the rapid and efficient collection, loading, transport and unloading of recyclable waste materials.

SUMMARY OF THE INVENTION

In the present invention, a unitized truck-mounted waste body includes a sliding cover and plural waste compartments separated by doors which are individually locked from the truck cab. Mounted on the side of the waste body are dual waste loading buckets, each with three waste bins corresponding to the compartments of the truck body.

The loading buckets are moved proximate to the wall of the waste body on roller tracks, pulled by hinged lift arms. To increase loading speed, hydraulic motors drive each set of lift arms connected to a torque tube. Curved upper roller track sections automatically tilt each loading bucket in a controlled arc to empty waste materials from the bucket bins into corresponding compartments in the truck body.

The buckets, lift arms and related components are designed with retaining rings, spline shafts, and similar elements to facilitate removal for maintenance and repair. The entire truck body can be tilted, and the interior compartment doors are individually released to prevent mixing of the separated waste during discharge.

An object of the present invention, then, is to provide a means for loading, transporting and unloading separated waste materials.

A further object of the present invention is to increase the speed, efficiency and convenience of curbside loading of separated materials into a waste collecting vehicle.

Another object of the present invention is to provide a self-loading transport body for recyclable waste that is easy to repair and maintain.

DESCRIPTION OF THE PREFERRED EMBODIMENT

Figure 1:
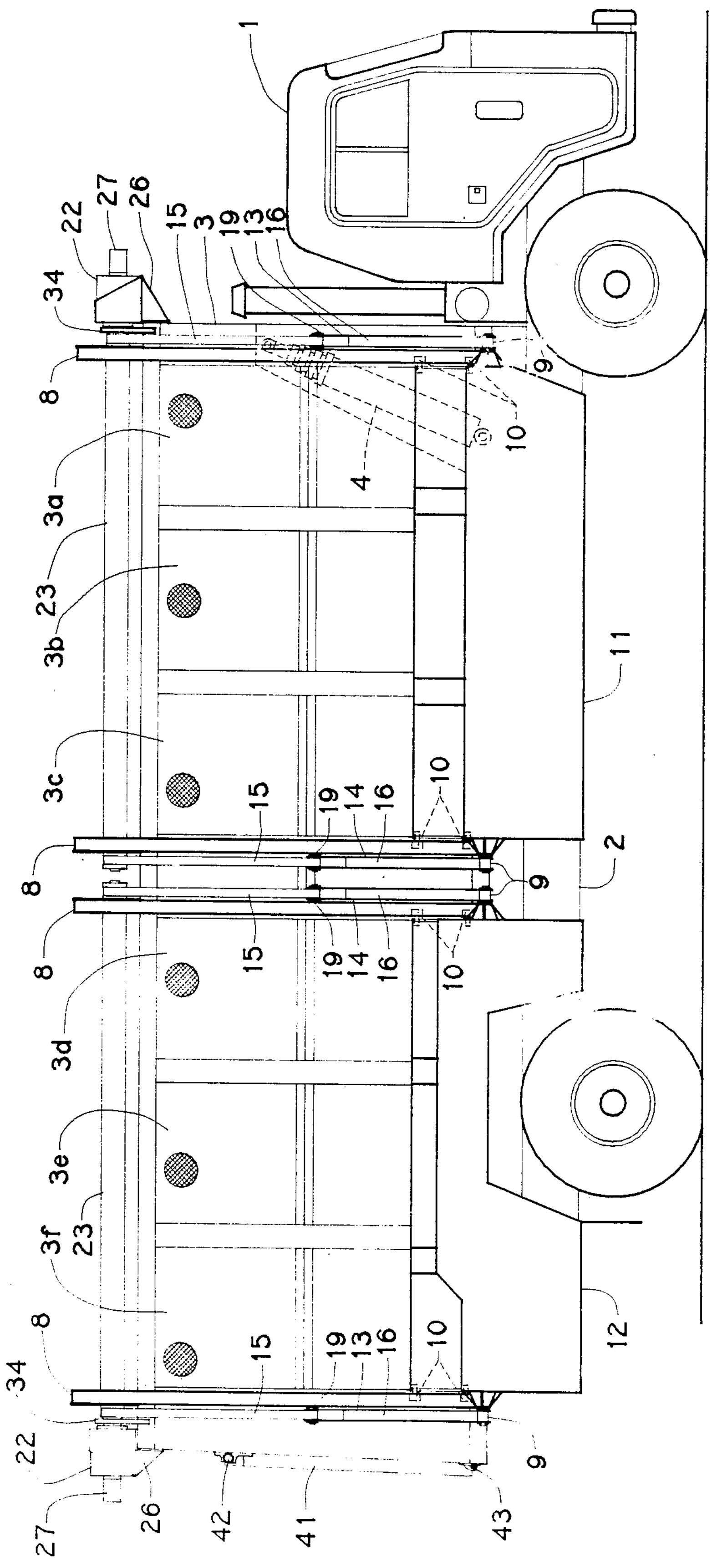
FIG. 1 is a side view of the truck-mounted waste transport body with loading buckets.
Figure 8:
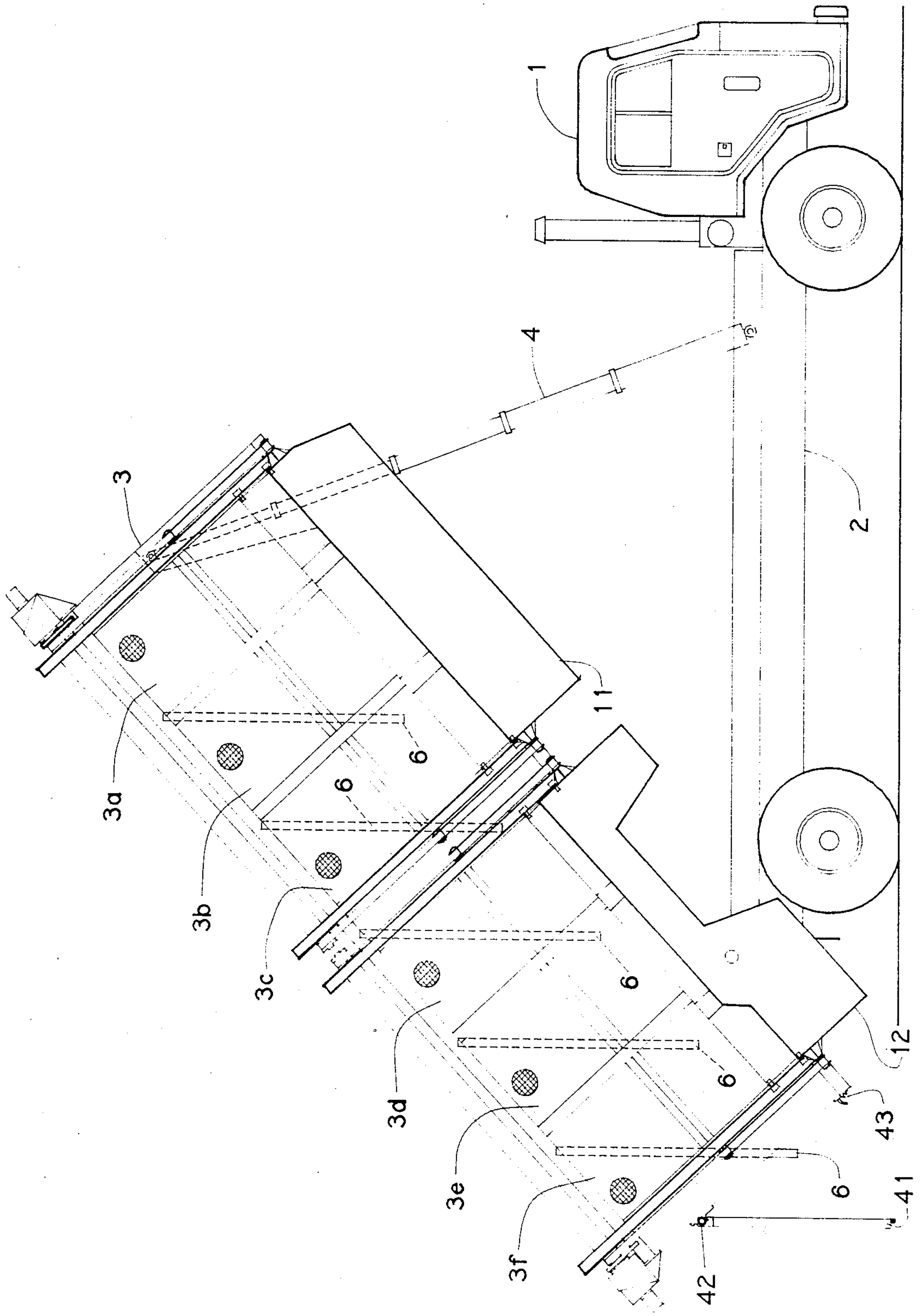
FIG. 8 is a side view of the truck mounted waste transport body tilted in the unloading position with all inner compartment doors shown in phantom.
Figure 9:
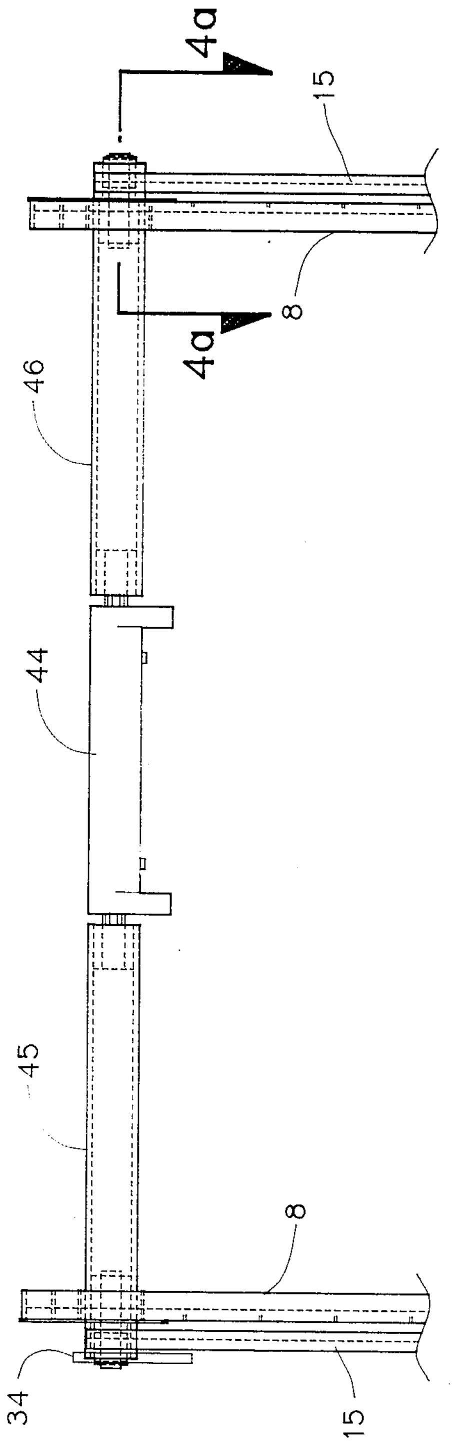
FIG. 9 is an enlarged side view of the alternate lift bucket mechanism with center mounted helical drive.

As shown generally in FIGS. 1 and 8, the waste transport body 3 of the present invention is mounted to frame 2 of a truck having an independent cab 1. Dump body 3 is hinged at the rear of truck frame 2 permitting tilting of body 3 by means of conventional telescoping hydraulic arm 4.

Figure 2:
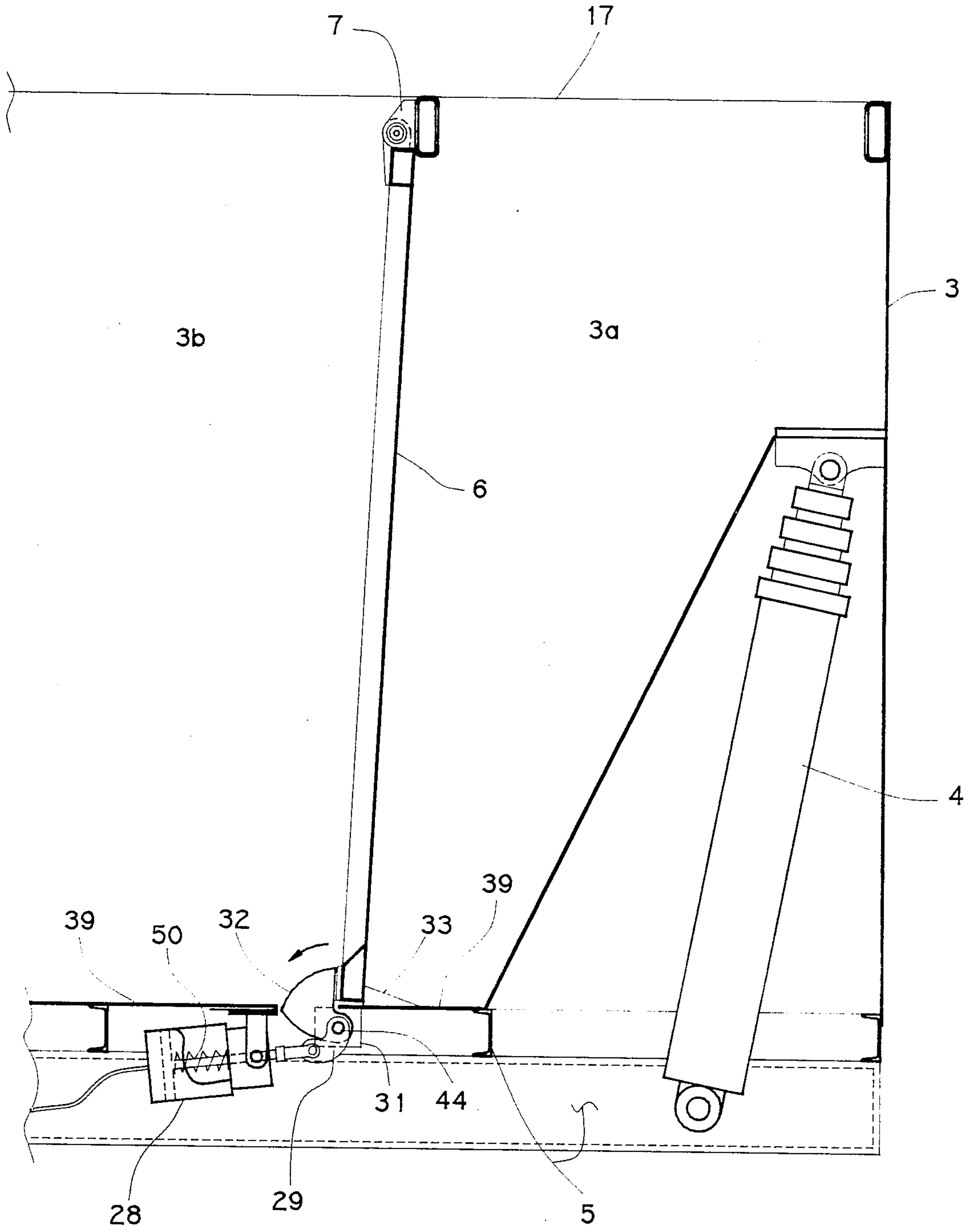
FIG. 2 is a partial side view of a section of the transport body showing the frame and a typical compartment door latching assembly.
Figure 3:
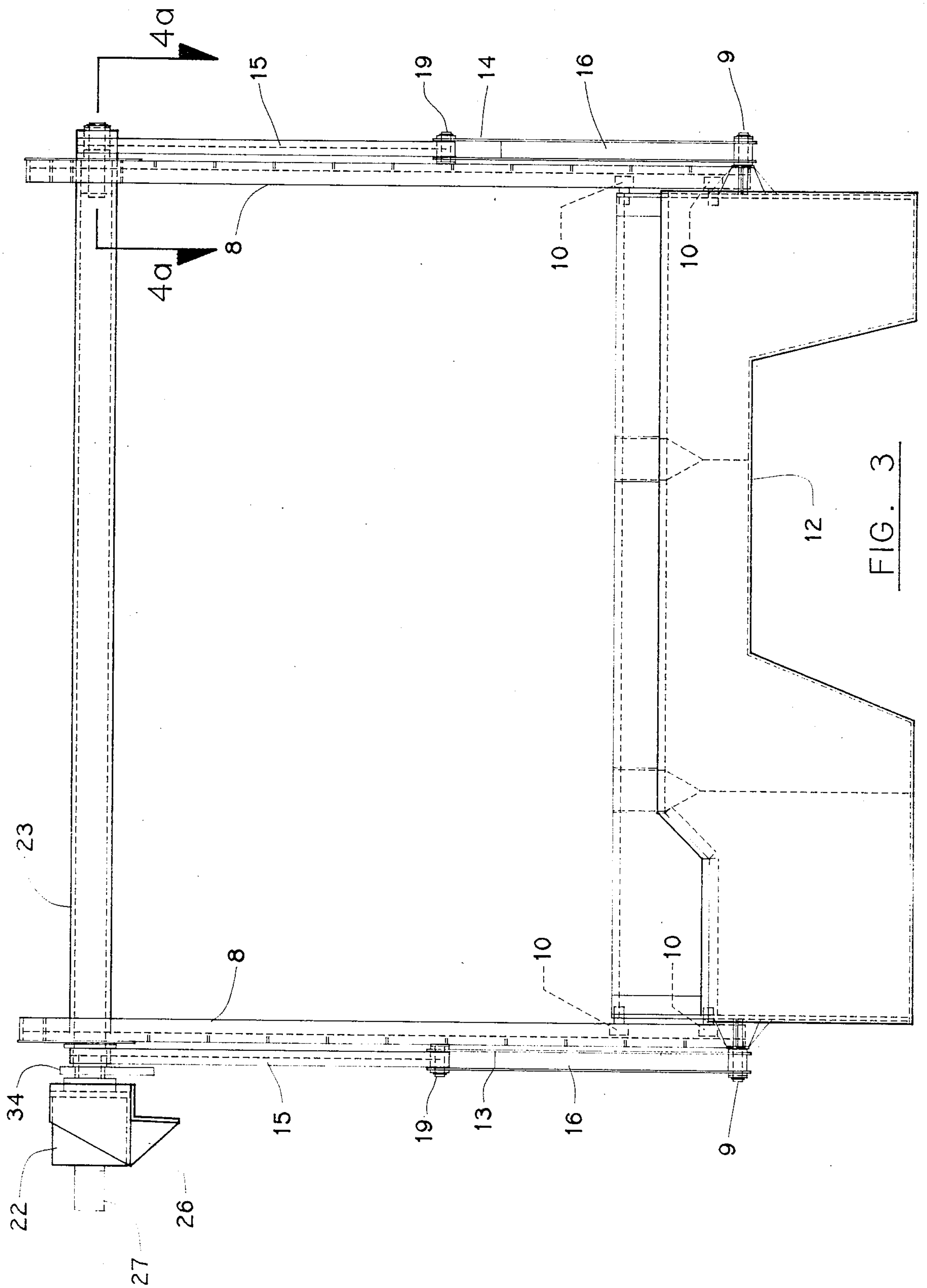
FIG. 3 is an enlarged side view of the lift bucket mechanism.
Figure 4A:
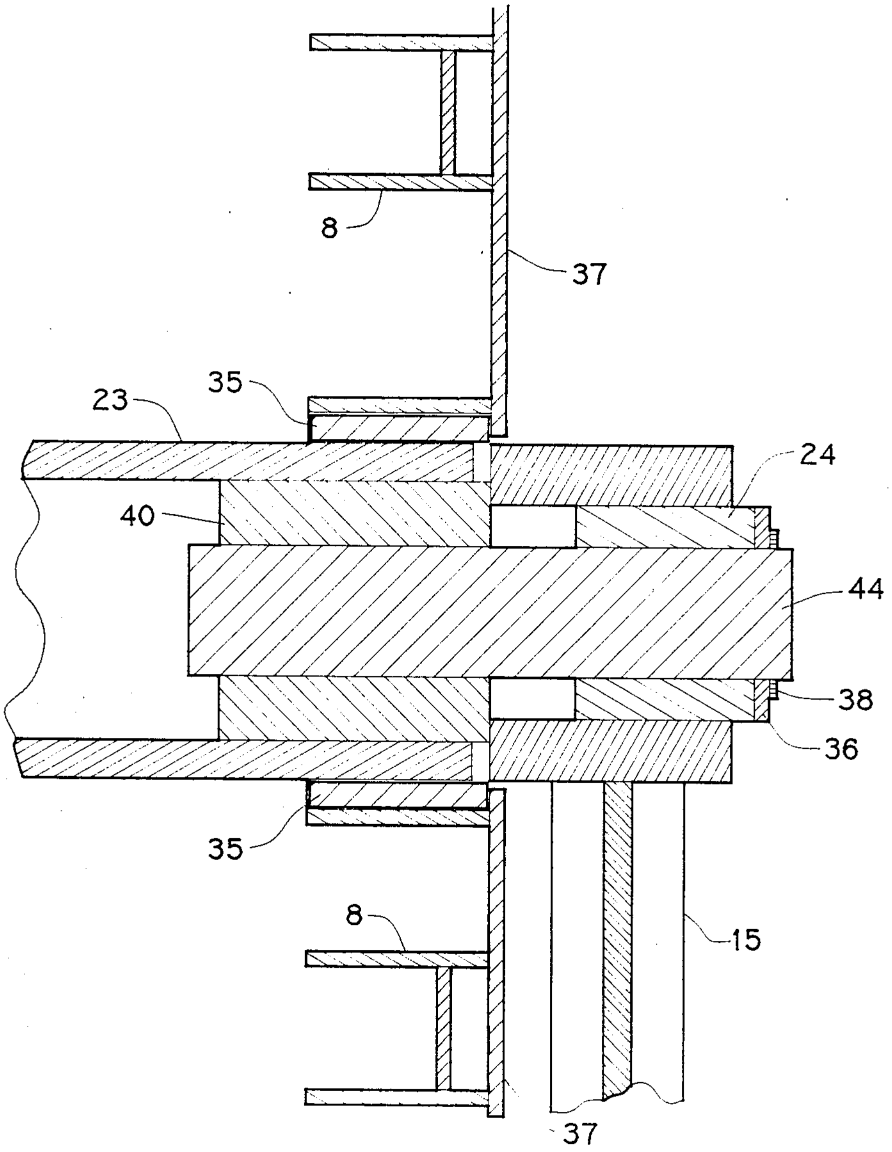
FIGS. 4(*a*), (*b*) and (*c*) are enlarged side and partial phantom views of each end of the lift bucket drive and torque tube assemblies and of the upper lift arm.
Figure 4B:
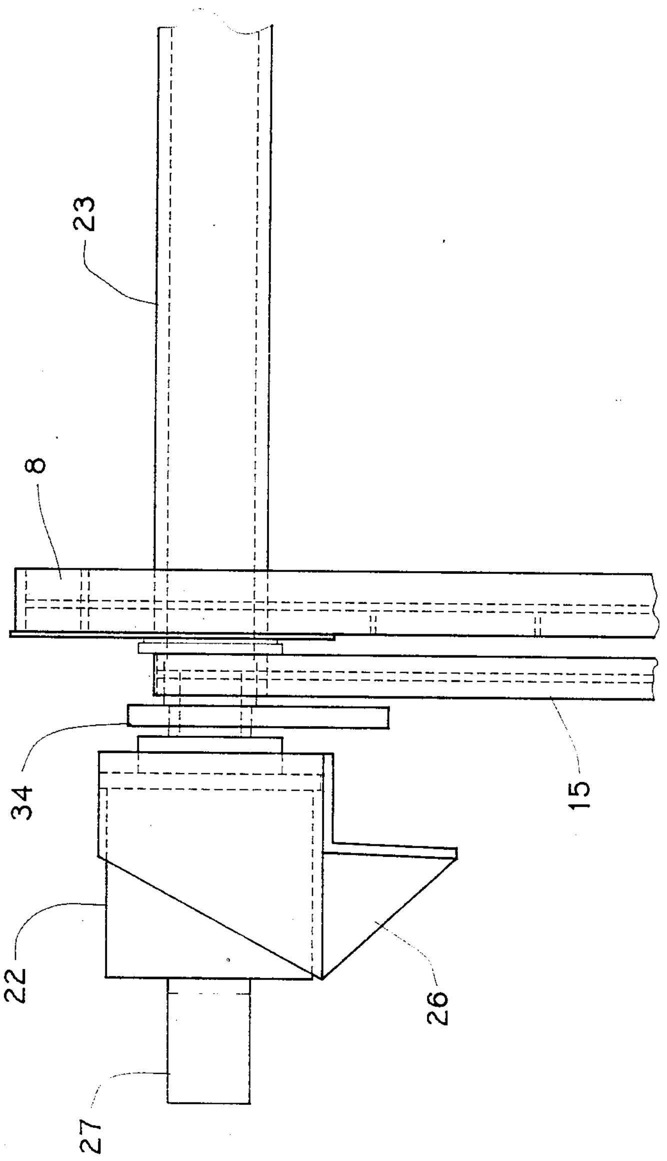
Figure 4C:
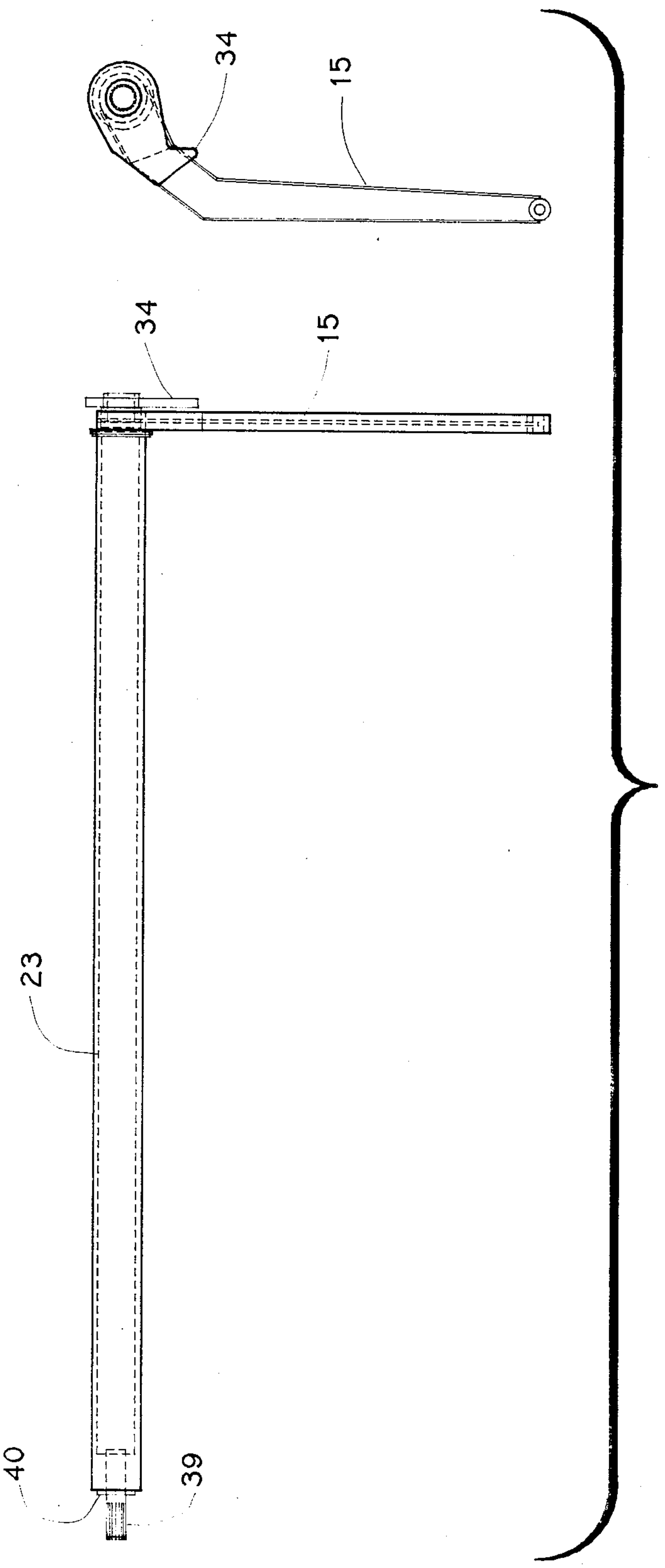
Figure 5:
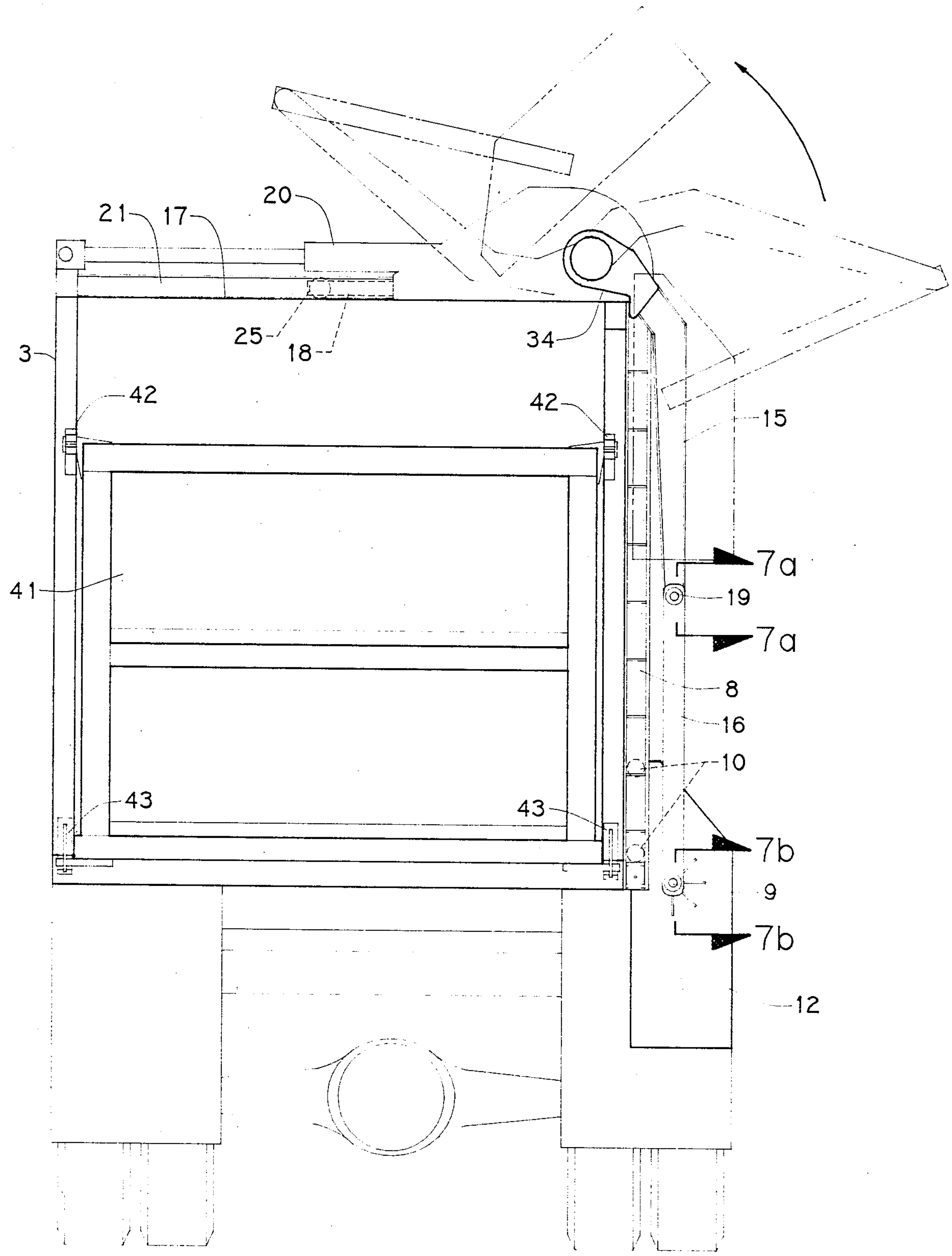
FIG. 5 is a rear view of the waste transport body showing the tailgate with a sequential end view of the lift bucket mechanism in operation.
Figure 6:
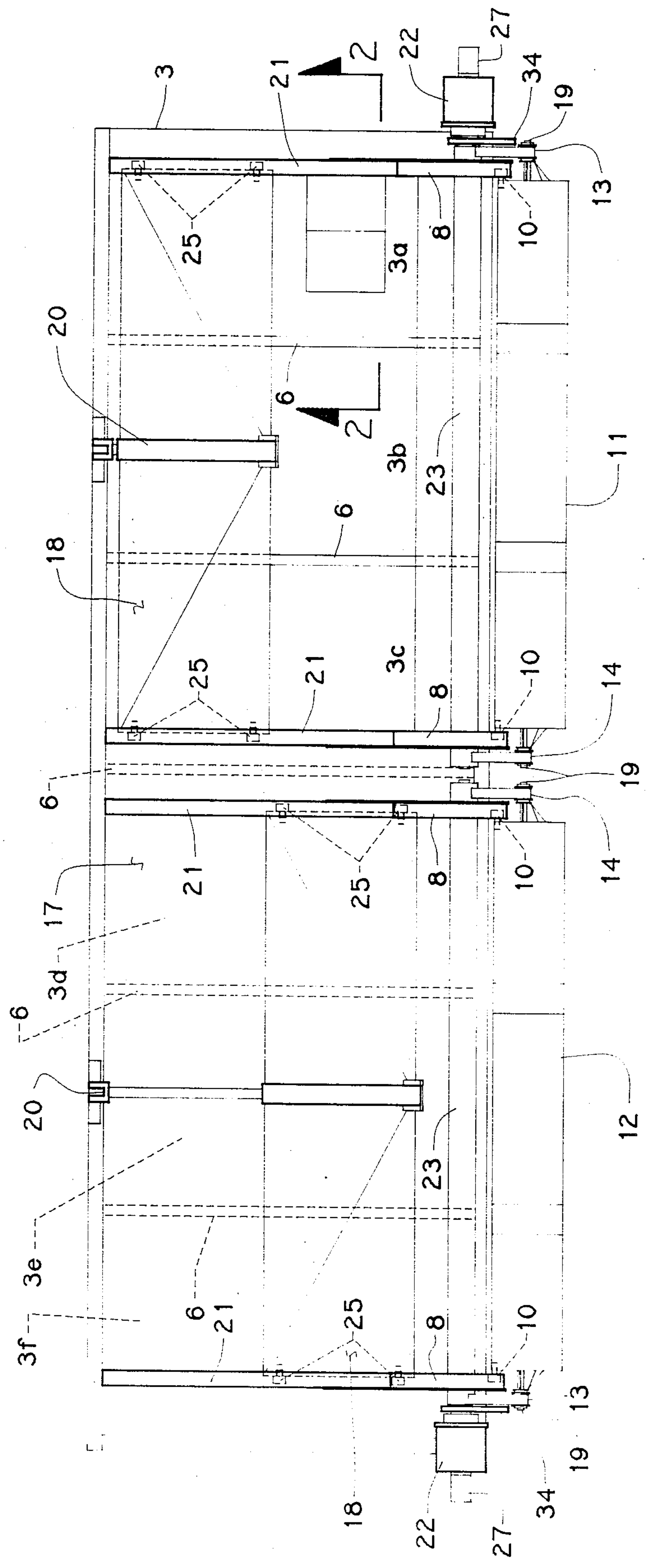
FIG. 6 is a top view of the waste body with one top cover open and the other sliding top cover in the closed position.
Figure 7B:
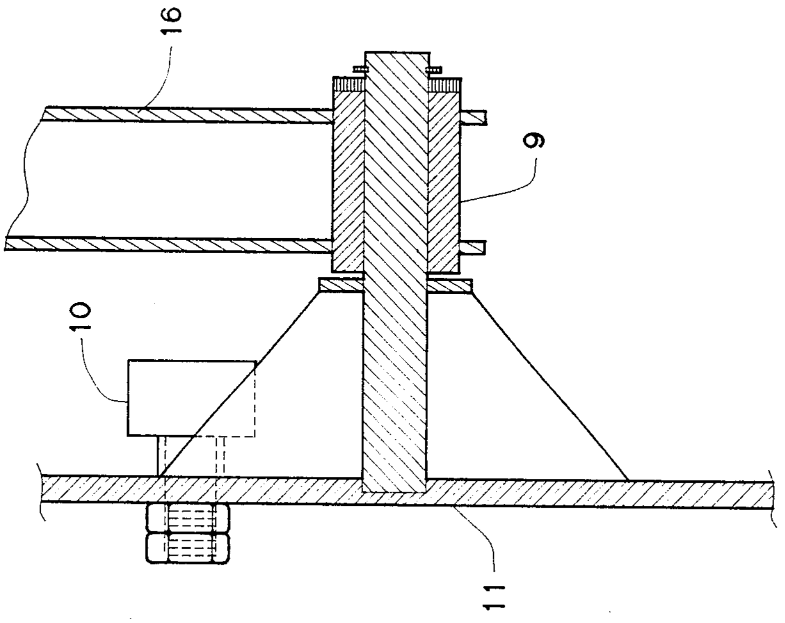
FIGS. 7(*a*) and (*b*) are enlarged sectional views of the upper and lower lift arm hinge assemblies.
Figure 7A:
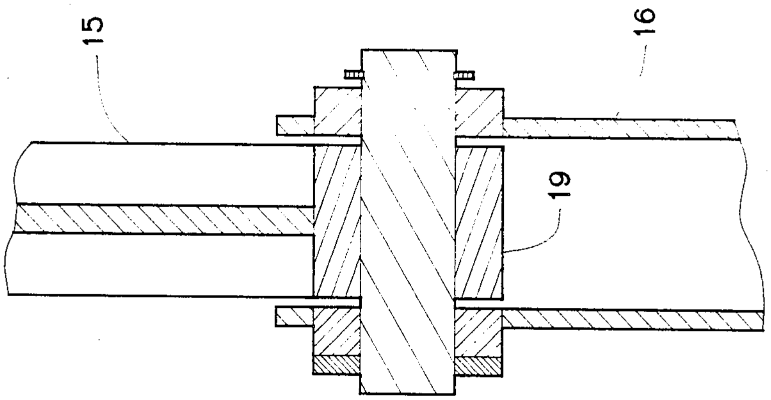

As best seen in FIGS. 1, 2 and 6, the floor and side walls of body 3 are supported by a frame 5 and covered by dual fixed top covers 17 and sliding top covers 18. In the preferred embodiment, each top coVer 18 includes rollers 25 which are received by roller tracks 21. Air cylinder assembly 20 is fastened to each of top covers 17 and 18 to drive sliding cover 18 within tracks 21 by movement of the piston of cylinder 20. Compressed air to power cylinder assembly 20 is supplied by the air system of the vehicle and controlled by switched air valves located on an external control panel immediately behind cab 1. Of course, cover 18 could also be electrically or hydraulically powered.

To accommodate separate loading, transport and unloading of recyclable waste, body 3 includes six internal waste compartments, 3*a* through *f*, separated by inner compartment doors 6 which swing from top hinges 7. As best seen on FIG. 2, which illustrates one of the five latch mechanisms, door stops 33 are mounted to floor plate 39 of body 3 in a position to maintain door 6 in a slight rearward angle when body 3 is level. This facilitates positive latching and unlatching of doors 6.

Air chambers 28 are mounted beneath floor plate 39 and are separately operated by switchable air valves located on a console inside cab 1. During loading and transport of waste, doors 6 are secured against stops 33 by means of latch plates 32 which rotate through slots in floor plate 39. Beneath plate 39, latch plates 32 are connected to door controller rods 44 which rotate through hinges 31 beneath floor plate 39. Air chambers 28, in turn, drive rods 44 through bushing and arm